May 14, 1929.  W. F. PERSONS  1,713,445
BUMPER
Filed May 25, 1928   2 Sheets-Sheet 2
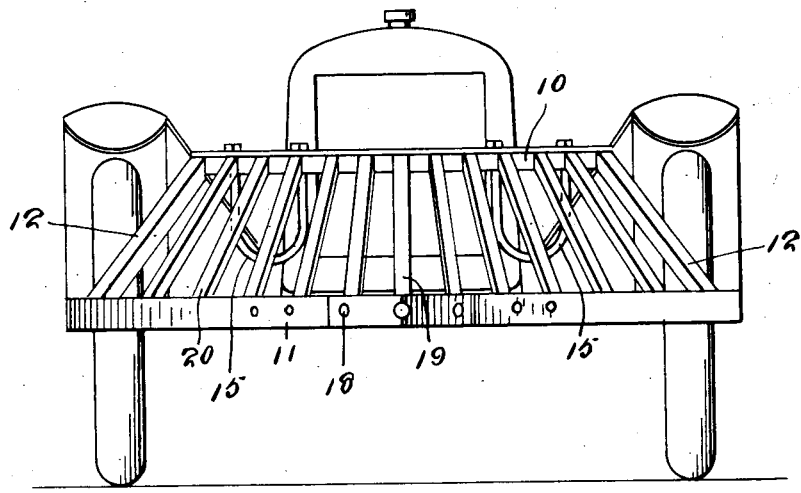
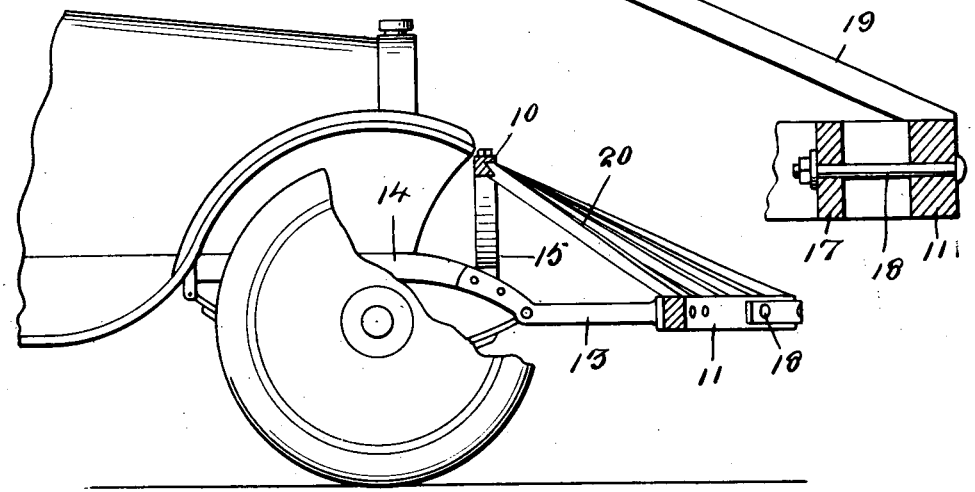
W. F. Persons
INVENTOR
BY Victor J. Evans
ATTORNEY Patented May 14, 1929.

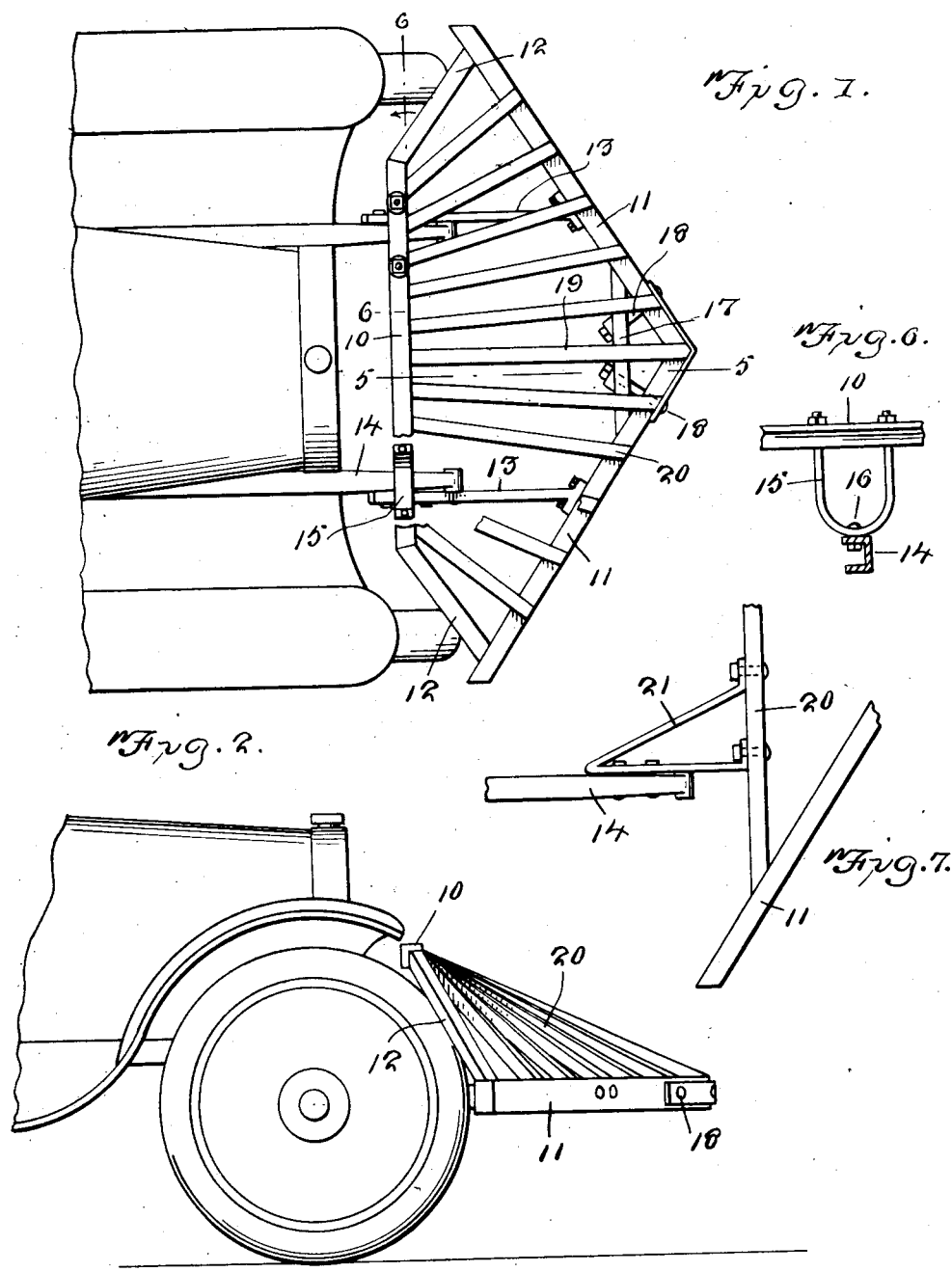

1,713,445

UNITED STATES PATENT OFFICE.

WILBER FISK PERSONS, OF DELEVAN, NEW YORK.

BUMPER.

Application filed May 25, 1928. Serial No. 280,594.

This invention relates to vehicle bumpers and has for an object the provision of a bumper which is especially adapted for use upon automobiles, and which is constructed so that when in contact with a vehicle or object, the vehicle to which the bumper is attached will be deflected laterally, or to one side of the center of the direct line of impact, and thus materially reduce shock.

Another object of the invention is the provision of a bumper of the above type which is constructed and so mounted upon a vehicle as to resist indirect or angular impact.

With the above and other objects in view, the invention further includes the following novel features and details of construction, to be hereinafter more fully described, illustrated in the accompanying drawings and pointed out in the appended claims.

In the drawings:—

Figure 1 is a plan view showing the front part of the vehicle with the bumper applied, part of the latter being broken away.

Figure 2 is a side view of the subject matter of Figure 1.

Figure 3 is a front view of the same.

Figure 4 is a side elevation partly in section.

Figure 5 is a fragmentary section on line 5—5 of Figure 1.

Figure 6 is a similar view on the line 6—6 of Figure 1.

Figure 7 is a fragmentary plan view of a slightly different form of the invention.

Referring to the drawings in detail, wherein like characters of reference denote corresponding parts, the bumper, as shown, comprises a frame which includes a horizontally disposed bar 10. The frame may be made of any suitable material and the bar 10 is adapted to extend across the vehicle above the sides bars of the frame. The frame also includes a substantially V-shaped contact bar 11 and this bar is positioned in front of and below the transverse bar 10. Adjacent ends of the bars 10 and 11 are connected, as shown at 12.

Secured to the bar 11 within the ends thereof are the outer ends of arms 13. These arms have their inner ends secured to the side bars 14 of the automobile frame by means of bolts or other suitable fastening devices. The arms 13 serve as a means for connecting the contact bar 11 with the vehicle frame, and in addition, are so arranged as to resist direct impact.

Extending through the transverse bar 10 are the spaced ends of substantially U-shaped supports 15 whose lower ends are secured to the side bars 14 as shown at 16. A horizontal bar 17 has its opposite ends secured to the contact bar 11 by means of relatively inclined bolts 18, so that spreading action of the contact bar will be resisted.

The bars 10 and 11 are connected by a central longitudinally disposed bar 19 and relatively inclined bars 20 which are arranged upon opposite sides of the bar 19. The bar 19 will serve to resist direct longitudinal impact, while the bars 20 will resist lateral impact.

In Figure 7, an additional transverse bar 20 is provided. This bar has its opposite end secured to the bar 11 and is connected to the side bars 14 of the automobile by means of substantial V-shaped braces 21. These braces include the spaced arms which resist both direct and lateral impact.

It will be seen from the foregoing description and accompanying drawings, that the shape of the bumper is such that the vehicle to which it is attached will be deflected to one side of another vehicle or object with which it comes in contact, so that the shock of a flat head-on contact will be materially reduced. In addition, the construction of the bumper and its manner of attachment to the frame of an automobile are such that direct longitudinal and lateral impact will be resisted.

The invention is susceptible of various changes in its form, proportions and minor details of construction, and the right is herein reserved to make such changes as properly fall within the scope of the appended claims.

Having thus described the invention, what is claimed is:—

1. In an automobile bumper, a frame including a transverse bar adapted to extend across the front of an automobile above the forward ends of the side bars of the automobile frame, means adapted to connect the transverse bar with the automobile frame, a substantially V-shaped horizontally disposed contact bar located in advance of and below the transverse bar, means connecting the ends of the transverse bar and V-shaped bars, parallel arms adapted to have their rear ends connected to the front ends of the side bars of the automobile frame, means securing the front ends of said arms to the V-shaped bar to connect said bar with said automobile frame and resist direct longitudinal impact, and relatively inclined bars connecting the transverse and V-shaped bars upon opposite sides of the center of the bumper to resist angular impact.

2. In an automobile bumper, a frame including a transverse bar adapted to extend across the front of an automobile above the forward ends of the side bars of the automobile frame, U-shaped yokes having their spaced ends secured to the transverse bar and having means for connection with the automobile frame, a substantially V-shaped horizontally disposed contact bar located in advance of and below the transverse bar, means connecting the ends of the transverse and V-shaped bars, parallel arms adapted to have their rear ends connected to the front ends of the side bars of the automobile frame, means securing the front ends of said arms to the V-shaped bar to connect said bar with said automobile frame and resist direct longitudinal impact, and relatively inclined bars connecting the transverse and V-shaped bars upon opposite sides of the center of the bumper to resist angular impact.

3. In an automobile bumper, a frame including a transverse bar adapted to extend across the front of an automobile above the forward ends of the side bars of the automobile frame, means adapted to connect the transverse bar with the automobile frame, a substantially V-shaped horizontally disposed contact bar located in advance of and below the transverse bar, means connecting the ends of the transverse and V-shaped bars, a lower transverse bar having its opposite ends secured to the V-shaped bar within the ends of the latter, V-shaped brackets having their spaced ends secured to the first-mentioned transverse bar and their other ends adapted for connection with the vehicle frame to resist direct and lateral impact, and relatively inclined bars connecting the transverse and V-shaped bars upon opposite sides of the center of the bumper to resist angular impact.

In testimony whereof I affix my signature.

WILBER F. PERSONS.